March 31, 1970     O. W. OERMAN     3,503,454
PLOWS HAVING HYDRAULIC TRIP BOTTOMS
Filed April 18, 1967     4 Sheets-Sheet 1
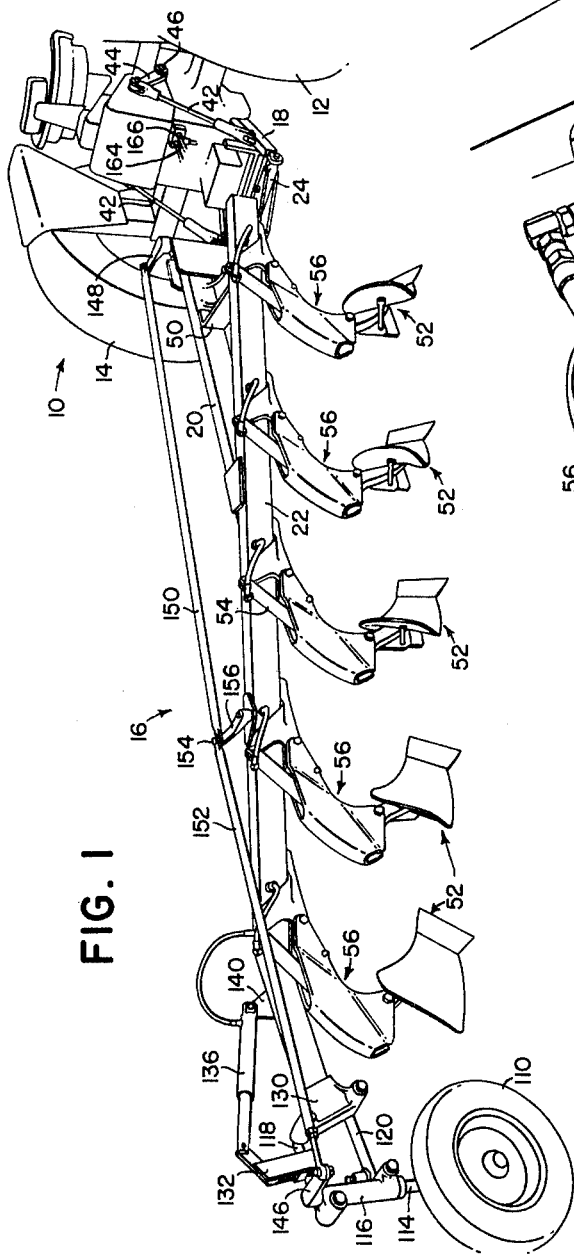
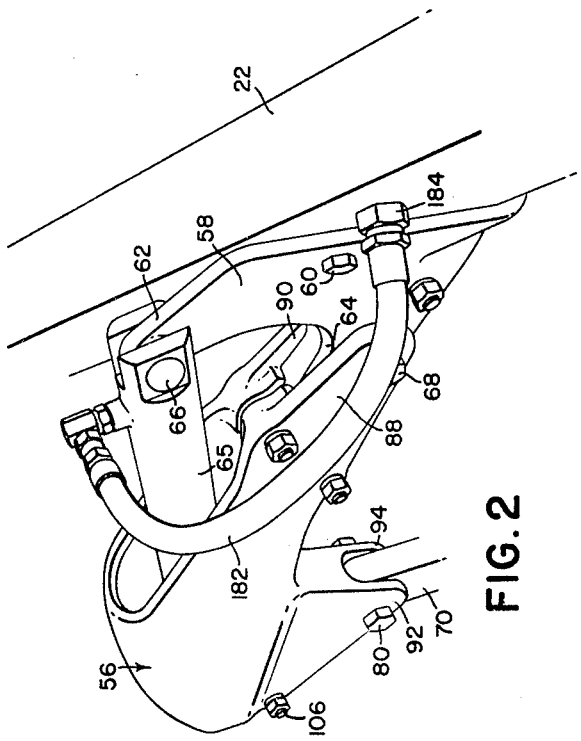
INVENTOR.
OREY W. OERMAN
BY
ATTORNEY March 31, 1970     O. W. OERMAN     3,503,454
PLOWS HAVING HYDRAULIC TRIP BOTTOMS
Filed April 18, 1967     4 Sheets-Sheet 2
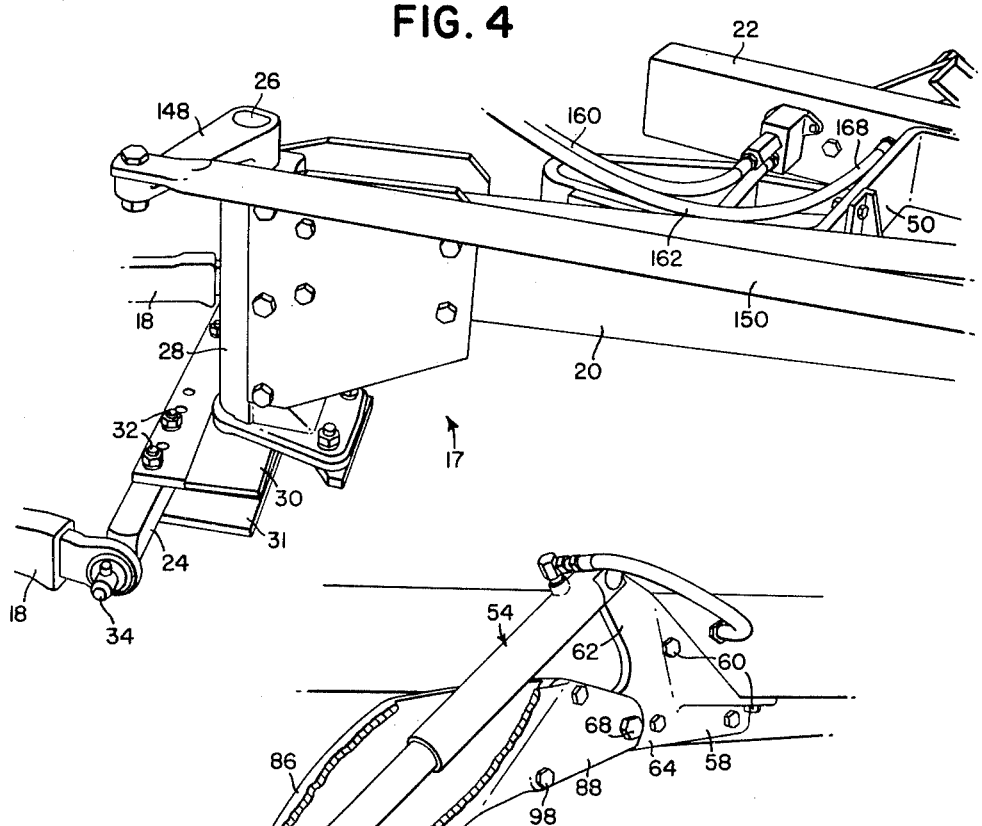
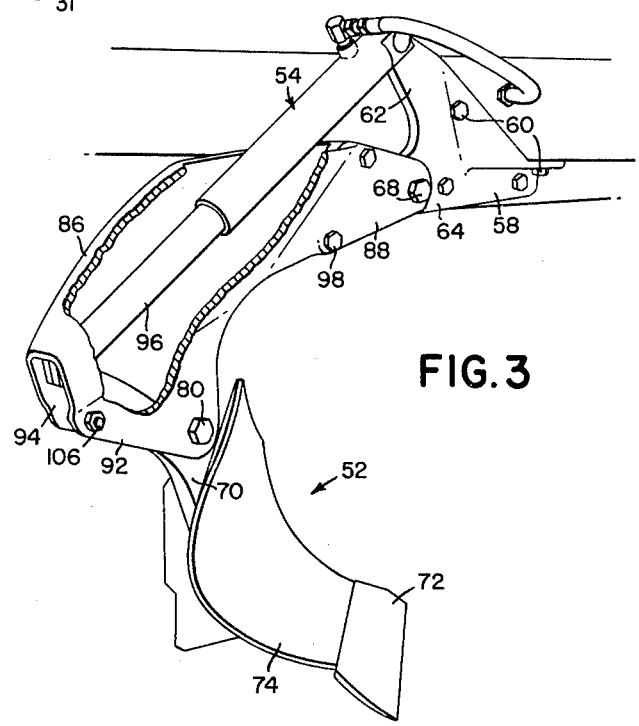
INVENTOR.
OREY W. OERMAN
BY
*John C. Thompson*
ATTORNEY

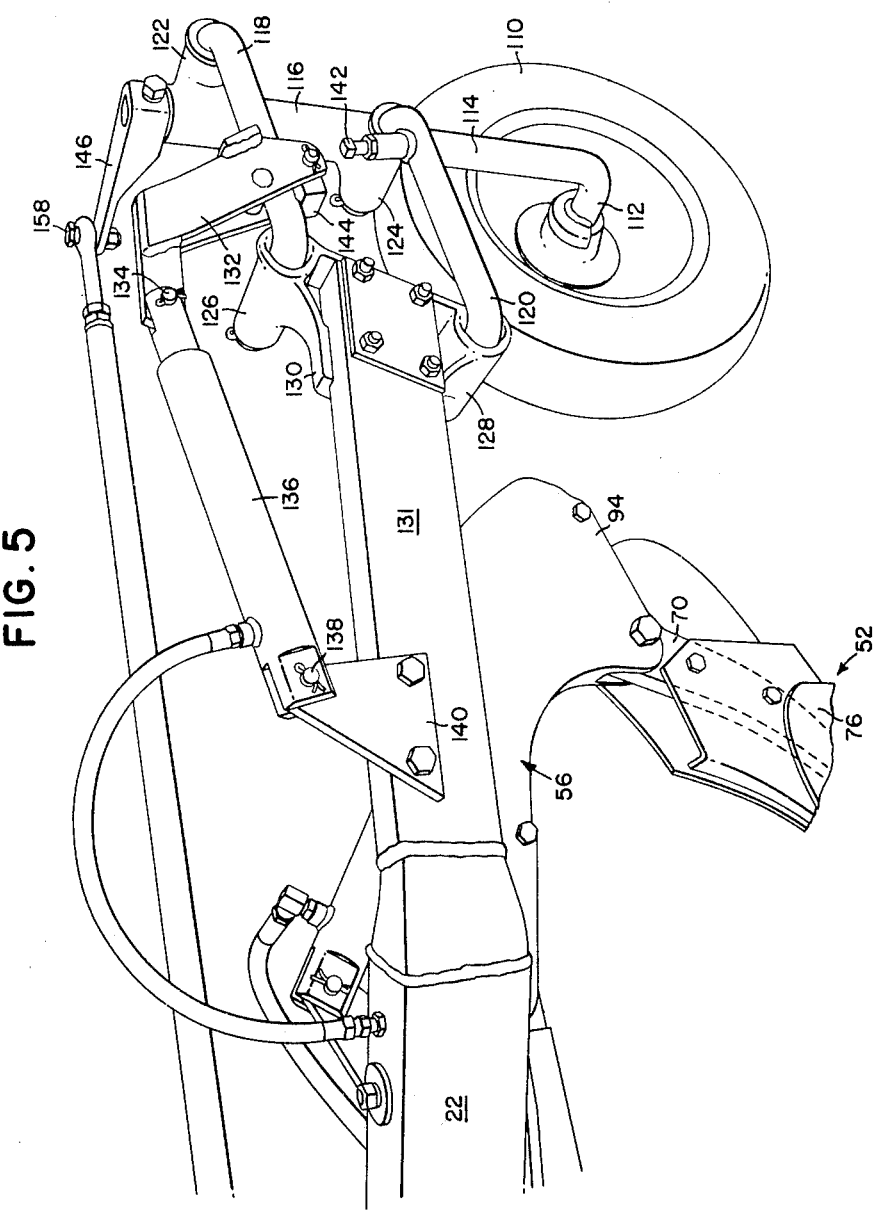

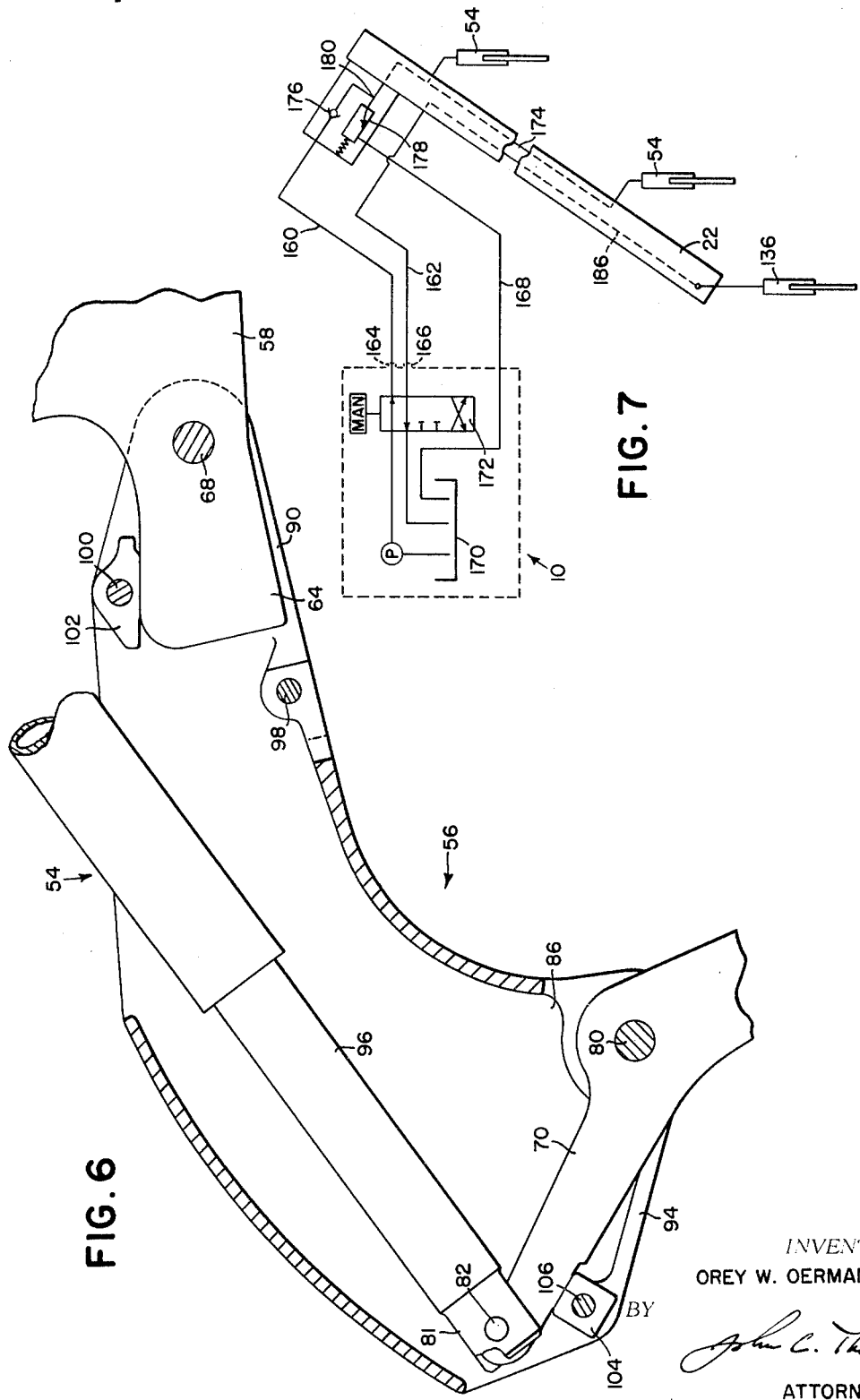

United States Patent Office 3,503,454
Patented Mar. 31, 1970

3,503,454
PLOWS HAVING HYDRAULIC TRIP BOTTOMS
Orey William Oerman, Moline, Ill., assignor to Deere &
Company, Moline, Ill., a corporation of Delaware
Filed Apr. 18, 1967, Ser. No. 631,681
Int. Cl. A01b 61/04
U.S. Cl. 172—265        4 Claims

ABSTRACT OF THE DISCLOSURE

A tractor drawn plow having a plurality of plow bottoms, each interconnected with an obliquely extending hollow main frame member by means of a hydraulic cylinder, the rod end of the cylinder being disposed within a tubular mounting beam that pivotally interconnects the plow bottom assembly with the main frame beam, the fluid line means connecting the cylinders with a source of fluid under pressure on the tractor being disposed at least in part within the hollow main frame beam.

BACKGROUND OF THE INVENTION

This application claims improvements in plow structure of the type shown in co-pending application Ser. No. 579,652 filed on Sept. 15, 1966 by L. G. Arnold, J. F. Sullivan and H. C. Esbeck.

The present invention relates generally to agricultural implements and more particularly to moldboard plows having plow bottom assemblies interconnected with the supporting frame of the plow by structure including a hydraulic cylinder which normally biases the plow into its ground working position.

It is an object of this invention to provide an improved hydraulic plow construction.

More particularly, it is an object of the present invention to provide in a plow having a pivoted plow bottom assembly, which is normally biased into a lower forward ground working position by means of a hydraulic cylinder, a mounting structure for the plow bottom assembly which will also provide protection for the cylinder.

It is a further object of the present invention to provide in a gang plow, having a plurality of hydraulic cylinders which normally bias the individual plow bottom assemblies into their lower forward working position, a hollow main frame member in which the fluid line means, that interconnect the cylinders with a source of fluid under pressure, may be disposed.

It is a still further object of the present invention to provide a plow bottom assembly mounting structure which is normally pivoted to the main frame of the plow and to which the plow bottom assemblies are pivotally interconnected, the mounting structure having high torsional stability.

Another object is to provide a pivoted mounting beam for a plow bottom assembly, the mounting beam being so mounted on the main frame of the plow that there is little side play of the mounting beam.

Another object of this invention is to provide a hydraulic plow construction of improved reliability.

These and other objects and advantages of this invention will be apparent to those skilled in the art after a consideration of the following detailed description, taken in conjunction with the accompanying drawings in which the preferred form of this invention is illustrated.

FIG. 1 is a perspective view taken from the right rear of a plow incorporating the principles of this invention.

FIG. 2 is a perspective view taken from the right front of a mounting beam structure and cylinder assembly used for interconnecting a plow bottom assembly with the main frame of a plow.

FIG. 3 is a view somewhat similar to FIG. 2 taken from the right rear.

FIG. 4 is a perspective view showing the manner in which the forward end of the plow is connected to the tractor.

FIG. 5 is a perspective view of the rear wheel assembly shown in FIG. 1.

FIG. 6 is a section taken through the mounting beam structure shown in FIGS. 2 and 3.

FIG. 7 is a schematic view illustrating the manner in which the various hydraulic cylinders on the plow are interconnected with the tractor hydraulic system.

In the following description right-hand and left-hand reference is determined by standing to the rear of the plow and facing the direction of travel.

Referring first to FIGS. 1 and 4, a farm tractor, indicated generally at 10 and having spaced apart right and left wheels 12 and 14, is shown to which a plow, indicated generally at 16, is secured by means of a forwardly extending hitch, indicated generally at 17. The hitch is secured at its forward end to the lower draft links 18 of the tractor. The hitch includes a forwardly extending bar 20 which is rigidly secured at its rear end to the obliquely extending main frame member 22. A cross beam 24 is secured to the hitch bar 20 by means of a vertically extending shaft 26 which is received within a sleeve 28 at the forward end of the bar 20. A pair of spaced apart plates 30, 31 are carried at the lower end of the shaft 26 and the beam 24 is adjustably secured between said plates 30, 31 by means of fasteners 32. It should be noted at this point that the cross beam 24 can swing about a normally vertically extending axis defined by the shaft 26. The outer ends of the cross beam 24 are reduced as at 34 and may be secured directly either to the apertured rear ends of the lower draft links 18 or they may be received by the lower hooks of a coupler such as of the type shown in FIG. 2 of U.S. application Ser. No. 579,652 filed Sept. 15, 1966 by Loren G. Arnold et al.

As is convenional, the lower draft links 18 are pivotally secured at their forward ends to the tractor 10, an intermediate portion of the draft links being interconnected with lift arms 42 which in turn are secured to rock arms 44 carried by rock shaft 46 on the tractor 10.

As previously noted, the hitch bar 20 is rigidly secured at its rear end to the obliquely extending main frame member 22 of the plow. Brace means 50 interconnect a forward portion of the frame member 22 with an intermediate portion of the bar 20.

A plurality of plow bottom assemblies 52 are interconnected with the main frame member 22, each of the interconnecting means including an extensible and retractable hydraulic cylinder assembly indicated generally at 54 and a mounting beam structure indicated generally at 56. A bracket structure 58 is rigidly secured to the obliquely extending main frame 22 by means of fasteners 60. The bracket structure 58 is formed with an upper portion 62 and a lower portion 64, each of these portions (as can best be seen from FIG. 2) being disposed away from the frame 22. The cylinder 65 is pivotally secured to the upper portion 62 by means of pivot pin 66, and the mounting beam structure is pivotally secured to the lower portion 64 by means of a pivot pin assembly 68.

The plow bottom assembly is generally conventional and includes a standard 70, a share 72, a moldboard 74, and a landside 76, the various parts being interconnected by means of a frog. An intermediate portion of a standard 70 is carried by a pivot bolt 80 and the upper end of the standard 70 is secured to the rod end 81 of cylinder assembly 54 by means of pivot pin structure 82.

The mounting beam structure includes a tubular member 86 which has upper forward spaced apart right and left hand plates 88, 90 and lower spaced apart plates 92, 94. As can best be seen in FIGS. 3 and 6, the tubular portion of the member 86 encloses the rod 96 of the cylinder assembly 54. The right and left members 88 and 90 are formed with aligned apertures (no number) which receive the pivot pin assembly 68 whereby the mounting beam structure is pivotally interconnected to the obliquely extending main frame 22. The spaced apart right and left hand members 88 and 90 are formed with generally parallel inner surfaces which closely embrace the sides of the lower portion 64 of the bracket 58. Additional aperture means are provided in the upper forward spaced apart members 88, 90 to receive a fastener 98 which is used to adjustably position the inner surfaces of the members 88, 90 into closely embracing relationship with the member 64. Another fastener 100 is received within additional aligned aperture means on the forward end of the tubular member and carries a stop 102 which contacts the upper surface of the lower portion of bracket 58.

The lower spaced apart members 92, 94 are apertured and receive the pivot pin 80 thereby interconnecting the standard 70 with the mounting beam structure 56. Further aligned apertures are provided in the spaced apart members 92, 94 and receive an adjustable stop member 104 which is carried by a fastener 106 disposed within the last mentioned apertures.

As can best be seen from FIG. 5, the rear end of the main frame 22 is supported by a rear furrow wheel 110 that is journaled for rotation about a stub axle 112 which in turn is carried at the lower end of a generally vertically extending shaft 114. An inner portion of the shaft 114 is rotatably received within a vertically extending sleeve portion of casting 116 which is carried for generally vertical movement by upper and lower parallel arms 118 and 120, respectively. The front and rear ends of the arms 118 and 120 are disposed at right angles to the intermediate portion of the arms and are journaled within sleeves, the rear ends of arms 118 and 120 being disposed within horizontal sleeves 122 and 124 formed in casting 116 and the forward ends of the arms 118 and 120 being disposed within horizontal sleeves 126 and 128 formed in a casting 130 secured to bar 131, which is in turn secured to the rear end of the main frame 22. An upstanding arm 132 is rigidly secured at its lower end to an intermediate portion of the upper arm 118 and the arm 132 is secured at its upper forward end by means of a pivot pin 134 to the rod end of a single acting hydraulic cylinder 136 whose forward end is pivotally secured by means of pivot pin 138 to a bracket 140 on the bar 131. Retraction and extension of the cylinder 136 will cause the wheel 110 to move upwardly and downwardly, the lower position being determined by the limit to which the cylinder 86 can extend and the upper position being determined by the adjustable stop 142 which contacts block 144.

Mounted on the upper end of the shaft 114 is a crank arm 146. This arm is interconnected with a front steering arm 148 (FIG. 1) by means of longitudinally extending links 150, 152 which are secured to each other through a pivot pin 154 that is carried at one end of an arm 156, the other end of the arm 156 being pivotally secured to the main frame member 22 of the plow. The front steering arm 148 is non-rotatably secured to the shaft 26.

To maintain the same steering angle of the rear furrow wheel 110 as it is moved between its raised working position and lowered transport position, the stop is adjusted so that when the rear ends of the arms 118, 120 are in their lowered position, the length between the pivot pin 158, which interconnects the link 152 with the arm 146, and the pin 154 is substantially the same distance as when the rear ends of the arms 118 and 120 are in their upper working position.

In operation, the plow is connected with the lower draft links 18 of a tractor. The tractor is preferably of the type having a variable displacement pump P (FIG. 7) and a reservoir 170 which are interconnected with a pair of fluid outlets 164, 166 through a manually operable valve 172 in such a manner that the pump and reservoir can be alternately interconnected with the outlets. Fluid lines 160 and 162 on the plow are connected with the pair of fluid outlets 164, 166 on the tractor. Also, a third fluid line 168 is connected with the reservoir 170 on the tractor. During plowing, fluid is introduced into the line 160 through the manually operated two-way closed center valve 172 from a variable displacement pump P on tractor 10. The fluid line 160 is interconnected with a manifold 174 disposed within the main box frame 22, there being a check valve 176 and a relief valve 178 interconnected with the manifold 174 through a T 180. The manifold 174 is in turn connected with the cylinders 54 disposed within the tubular members 86 by fluid lines 182. To this end, fittings 184 are provided on the right side wall of the beam member 22 to which the fluid lines 182 can be secured, the fittings 184 being in turn interconnected with manifold 174. When fluid is being introduced into the lines 160, 174, 182, the plow bottoms are biased forwardly and downwardly by the cylinder 54 into their normal ground working position, the standard 70 abutting stop 104 and the tubular member 86 (through stop 102) abutting the upper surface of the lower portion 64 of bracket 58. If the plow bottom assembly should encounter a rock or other obstruction during plowing, the bottom can trip upwardly and rearwardly away from the stops 104 and 102 compressing the cylinder 54 and displacing the oil from the compressed cylinder through relief valve 178 and into the discharge line 168 that is connected directly with the reservoir of the tractor 170.

The cylinder 136 which is used to raise and lower the rear wheel 110 is connected with fluid line 162 by means of a conduit 186 also disposed within the beam member 22. When the cylinders 54 are interconnected with the pump P through outlet 164, the cylinder 136 is interconnected with the reservoir 70 through fluid lines 186, 162 and outlet 166. In this position, the wheel 110 will move upwardly relative to the plow bottoms 152.

Should it be desired to raise the plow for transport, the rock shaft 46 is caused to be rotated to raise the forward end of the plow and the lever 172 is moved to its other position connecting outlet 166 with the pump P thereby causing fluid to flow into the cylinder 136 causing it to be extended thereby raising the rear end of the plow. In this position, the check valve 176 will hold the fluid within manifold 174 and cylinders 54.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. For use with a tractor having a source of fluid pressure and a fluid reservoir, a plow comprising: a main frame having an obliquely extending hollow box beam, a draft frame secured at its rear end to said main frame and securable at its forward end to said tractor, a plurality of plow standards swingably interconnected with said main frame, a plow bottom secured to each of said standards, an extensible and retractable hydraulic cylinder for each of said standards, one end of each of said cylinders being pivotally interconnected with the hollow box beam and the other end being pivotally interconnected with said standard, manifold means disposed within said hollow box beam, a plurality of fluid line fittings mounted in a wall of said hollow box beam, there being one of said fittings positioned adjacent the point of pivotal connection of said one end of each of said cylinders to said hollow box beam, means interconnecting each of said fittings with said manifold means, fluid line means interconnecting each of said cylinders with its associated fitting, each of said fluid line means being releasably coupled to its associated fittings, and means operable to connect said manifold means with said source of fluid pressure.

2. A mounting beam structure for interconnecting a plow bottom assembly with the main frame of a gang plow in such a manner that the plow bottom assembly, which is normally biased into its working position by a retractable cylinder, may swing upwardly and rearwardly into a tripped position, one end of the cylinder being pivotally secured to the main frame, and the other end of the cylinder being pivotally interconnected with an upper portion of said plow bottom assembly, said mounting beam structure comprising: a tubular member having an upwardly and forwardly extending enclosed portion within which the rod end of said cylinder is disposed, the upper forward end of said cylinder being disposed outwardly of said enclosed portion, first transverse aperture means within the upper forward end of the tubular member whereby said mounting means may be pivotally secured to said frame by pivot means passing through said first aperture means, and second transverse aperture means within the lower end of the tubular member whereby said plow bottom assembly may be pivotally secured to said mounting beam by pivot means passing through said second aperture means.

3. The mounting beam structure set forth in claim 2 in which the upper forward end of said tubular member is formed with two spaced apart portions having the first transverse aperture means disposed therein, said spaced apart portions closely embracing a portion of said main frame whereby side play is materially reduced.

4. The mounting beam structure set forth in claim 3 in which said spaced apart members are provided with aligned third transverse aperture means for the reception of fastener means to adjustably hold the spaced apart members in position for closely embracing a portion of the main frame.

References Cited

UNITED STATES PATENTS

| | | | |
|---|---|---|---|
| 2,620,715 | 12/1952 | Silver et al. | 172—272 |
| 2,879,853 | 3/1959 | Seng | 172—226 |
| 3,039,541 | 6/1962 | Harden et al. | 172—677 |
| 3,061,020 | 10/1962 | Mannheim | 172—285 |
| 3,172,481 | 3/1965 | Trollsas | 172—261 |
| 3,224,392 | 12/1965 | Mellen | 172—316 X |
| 3,349,855 | 10/1967 | Knudson | 172—261 |

ROBERT E. PULFREY, Primary Examiner

ALAN E. KOPECKI, Assistant Examiner

U.S. Cl. X.R.

172—291, 413